US005711485A

United States Patent [19]

Wheeler

[11] Patent Number: 5,711,485

[45] Date of Patent: Jan. 27, 1998

[54] PNEUMATIC TRIGGER VALVE FOR SPRAY GUN

[75] Inventor: Roger D. Wheeler, Holland, Ohio

[73] Assignee: Ransburg Corporation, Indianapolis, Ind.

[21] Appl. No.: 565,298

[22] Filed: Nov. 27, 1995

[51] Int. Cl.[6] .............................. B05B 1/28; B05B 9/00; F16K 51/00; F16L 39/00

[52] U.S. Cl. .......................... 239/105; 239/124; 239/290; 239/415; 239/528; 251/151; 285/319

[58] Field of Search .................................. 251/143, 148, 251/151; 285/319, 921; 239/407, 412, 413, 414, 415, 105, 290, 526, 527, 528, 124

[56] References Cited

U.S. PATENT DOCUMENTS 4,294,411 10/1981 Hastings et al. .................... 239/415 X 5,332,159 7/1994 Grime et al. ............................ 239/412

5,460,203 10/1995 Smith et al. ........................ 239/407 X

*Primary Examiner*—Andres Kashnikow

*Assistant Examiner*—Robin O. Evans

*Attorney, Agent, or Firm*—MacMillan, Sobanski & Todd

[57] ABSTRACT

The invention is directed to an improved pneumatic valve for use in paint spray guns of the type having a pneumatic trigger operating mode. When actuated by a trigger, the valve vents a pressurized chamber in the spray gun, causing a piston to move to open air and fluid valves for initiate spraying. The pneumatic valve is in the form of a snap in module which is easily replaced without the need to remove the spray gun from the spray booth and without the need to replace a number of small parts. A small return spring and the pressurized air urge a valve poppet to a closed position. When the trigger is operated, the poppet is unseated to vent the pressurized chamber in the spray gun. The flow of air through the valve during painting prevents dirt and paint overspray from accumulating on the valve.

8 Claims, 1 Drawing Sheet

PNEUMATIC TRIGGER VALVE FOR SPRAY GUN

TECHNICAL FIELD

The invention relates to spray guns and more particularly to a pneumatic trigger valve for use in a paint spray gun.

BACKGROUND ART

In a typical hand held paint spray gun, a trigger is manually operated to move a valve needle in an axial direction for turning the gun on and off. When the trigger is initially moved a short distance, a valve is opened to initiate a flow of atomization air and a flow of any pattern shaping air. After a flow of atomization air is initiated, further movement of the trigger moves the valve needle to progressively open a paint valve. When the trigger is released, the valve needle is moved to first interrupt the flow of paint and then to interrupt the flow of atomization air.

U.S. Pat. No. 5,332,159 illustrates a paint spray gun which includes multiple trigger operating modes. A main trigger has two operating modes. In a first operating mode, the trigger operates as described above for opening an atomization air valve and then to progressively open a paint valve as the trigger is squeezed. In a second operating mode, movement of the trigger opens and closes a pneumatic valve. When the pneumatic valve is opened, a chamber in the spray gun is vented and air pressure acting on a piston rapidly moves the piston to open an air valve and to move the valve needle to a fully opened position. When the trigger is released, the pneumatic valve is closed, air pressures on opposite sides of the piston become balanced and a spring rapidly moves the valve needle to the fully closed position. It has been found that the pneumatic valve shown in U.S. Pat. No. 5,332,159 can be improved in several ways. If the valve does not properly close, for example, because of dirt or an accumulation of paint overspray, there may be sufficient air flow through the valve to keep the spray gun constantly triggered on. The air pressure on the valve tends to open the valve rather than urging the valve closed. Further, the existing valve consists of a number of very small parts which must be installed in the spray gun. These parts required frequent cleaning to remove dirt and overspray and required periodic lubrication for proper operation. When the valve fails or requires service such as cleaning and lubrication, the spray gun must be taken out of operation for a sufficient period of time for the valve to be disassembled and cleaned or repaired. Possible down time for maintenance when the spray gun cannot be used is an important consideration when the spray gun is used in commercial applications. Any product improvements which reduce possible down time are an important consideration when a product is purchased.

DISCLOSURE OF INVENTION

The invention is directed to an improved pneumatic valve for use in paint spray guns having a pneumatic trigger operating mode of the type shown in U.S. Pat. No. 5,332,159. The pneumatic valve is in the form of a snap in module which is easily replaced without the need to remove the spray gun from the spray booth and without a significant down time. Further, the pneumatic valve has a longer service life than the prior art valve.

The pneumatic valve is adapted for use in a spray gun having a pressurized air chamber communicating with a trigger valve actuator. The spray gun remains off so long as adequate pressurized air is present in the chamber. When the air pressure in the chamber is sufficiently vented, the trigger valve actuator moves to initiate spraying. The pressurized air chamber is vented to atmosphere through a passage in the gun housing. According to the invention, a normally closed pneumatic valve is designed to engage and close the passage. The pneumatic valve has a releasable retaining mechanism, such as a pair of barbed resilient fingers, which engage the spray gun to hold the pneumatic valve on the spray gun. When the spray gun trigger is manually moved to trigger the gun, a valve stem is moved in an axial direction to unseat a poppet, thereby venting the pressurized air chamber in the spray gun through the pneumatic valve to atmosphere. The valve stem and poppet are moved against the air pressure and against the pressure of a small return spring. When the gun trigger is released, the air pressure and the return spring move the poppet to a closed position to allow air pressure to quickly build up in the spray gun chamber.

When necessary, the pneumatic valve is easily and quickly changed. It is only necessary to interrupt the air pressure to the spray gun, release the resilient finger retaining mechanism and slide the valve off of the spray gun. A new valve is easily pushed in place until the resilient finger retaining mechanism snaps in place, the air pressure is turned on and spraying can be continued.

Accordingly, it is an object of the invention to provide an improved pneumatic trigger valve for a paint spray gun.

Other objects and advantages of the invention will become apparent from the following detailed description of the invention and the accompanying drawings.

BEST MODE FOR CARRYING OUT THE INVENTION

Figure 1:
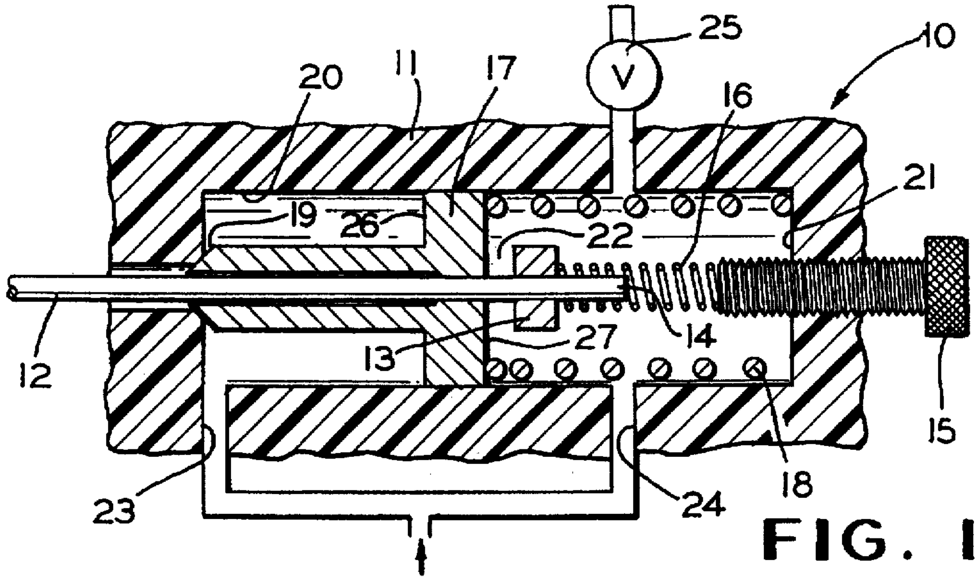
FIG. 1 is a fragmentary diagrammatic view illustrating operating of a pneumatic circuit for triggering a spray gun.

Referring to FIG. 1 of the drawings, a fragmentary diagrammatic view is shown of the pneumatic triggering circuit 10 for a paint spray gun, for example, of the type shown in U.S. Pat. No. 5,332,159, the disclosure of which is incorporated herein. The spray gun includes a housing 11 in which a valve needle 12 is mounted for reciprocating movement in an axial direction. The valve needle 12 is illustrated in a position wherein a paint valve (not shown) is closed, and movement of the valve needle 12 a short distance to the right in FIG. 1 opens the paint valve to initiate spraying. A collar 13 is secured to the valve needle 12 near or at an end 14. An axially adjustable stop 15 may be provided for limiting the maximum axial movement of the valve needle 12. The position of the stop 15 can be adjusted to limit the travel of the valve needle 12 in order to adjust the paint flow when the valve is opened. A valve needle return spring 16 acts between the valve needle 12 or the collar 13 and either the housing 11 or the stop 15 to urge the valve needle 12 to the closed position when the spray gun is not triggered on.

In one operating mode of the spray gun, the valve needle is pneumatically operated by a piston 17. Normally, a return spring 18 urges the piston 17 to a position closing an atomization and pattern shaping air valve 19. The piston 17 is coaxial with the valve needle 12 and slides in the housing 11. The piston 17 separates two closed chambers 20 and 21. Suitable sliding seals (not shown) may be provided between the piston 17 and the housing 11 and between the piston 17 and the valve needle 12 to prevent significant gas leakage between the chambers 20 and 21, while permitting the piston 17 to freely slide in the housing 11. When the piston 17 is positioned to close the air valve 19, a small clearance 22 will be present between the piston 17 and the collar 13 to allow for manufacturing tolerances and to cause the air valve 19 to open prior to the paint valve and to close after the paint valve.

Compressed air is applied from a source (not shown) through a passage 23 to the chamber 20 and through a passage 24 to the chamber 21. Preferably, the passage 24 either includes a restriction or is of a smaller diameter than the passage 23. The maximum compressed air flow in the passage 24 is preferably a small portion of the flow of pressurized atomization and pattern shaping air in the passage 23. So long as both chambers 20 and 21 are closed, the compressed air acts equally on both sides of the piston 17. The piston will remain seated to close the air valve 19 due to the force of the piston return spring 18. However, if the chamber 21 is vented through a trigger actuated pneumatic valve 25, the air pressures acting on opposite sides of the piston 17 become unbalanced. The air pressure acting on a side 26 of the piston 17 in the chamber 20 will become significantly larger than the total force of the air pressure and the spring 18 acting on a side 27 of the piston 17 in the chamber 21. The resulting forces quickly move the piston 17 in a direction towards the stop 15. As the piston 17 moves, the air valve 19 opens and then it engages the collar 13 and moves the valve needle 12 until it contacts the stop 15, thus opening the paint valve. When the valve 25 is closed, the air pressure in the chamber 21 will quickly increase. When the pressure increases to the point that the difference between the forces acting on the opposing piston sides 26 and 27 is less than the force that the spring 18 exerts on the piston 17, the piston 17 is moved to sequentially close the paint and air valves.

Figure 2:
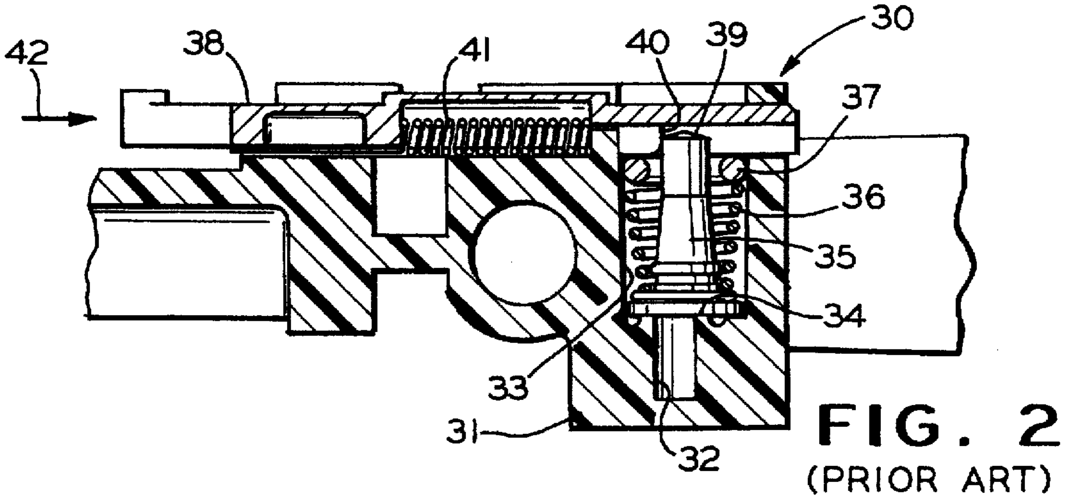
FIG. 2 (PRIOR ART)
FIG. 2 is an enlarged cross sectional view showing details of a prior art pneumatic trigger valve for a paint spray gun.

FIG. 2 shows details of the prior art pneumatic valve 30 used as the vent valve 25 in the circuit 10 of FIG. 1. The valve 30 is mounted in a skeleton or housing 31 of a spray gun. A passageway 32 connects with a chamber (not shown) which is equivalent to the chamber 21 of FIG. 1. The passageway 32 has an enlarged diameter end section 33 which forms an annular valve seat 34. A valve member 35 is located in the end section 33. A spring 36 acts between the valve member 35 and a retainer ring 37 to urge the valve member 35 to engage and seal against the seat 34, closing the passage 32. A slider or push bar 38 is secured to the housing 31 to slide in an axial direction. An end 39 of the valve member 35 is engaged by a bumper 40 on the push bar 38. A spring 41 urges the push bar 38 to the position illustrated in FIG. 2 wherein the bumper 40 does not affect the position or orientation of the valve member 35. When a manual spray gun trigger (not shown) is squeezed to initiate spraying, the push bar 38 is moved to the right in FIG. 2, as shown by an arrow 42, and the bumper 40 tilts the valve member 35 off of the seat 34. Pressurized air then is vented through the passage end 33 and past the push bar 38 to atmosphere to vent the chamber 21 of FIG. 1.

The prior art valve 30 has several disadvantages. Each time the valve 30 requires servicing, the several small parts forming the valve 30 must be disassembled from the spray gun housing 31 and the valve 30 must then be reassembled in the housing 31. This may necessitate taking the spray gun out of operation for a significant time. Further, the push bar 38 must be periodically lubricated to assure that it will slide freely. The push bar 38 also is exposed where it can easily become contaminated with dirt and paint overspray. If the push bar 38 does not slide freely, it may not return the valve 30 to its normally closed position when the spray gun trigger is released. This will cause the spray gun to continue spraying paint.

Figure 3:
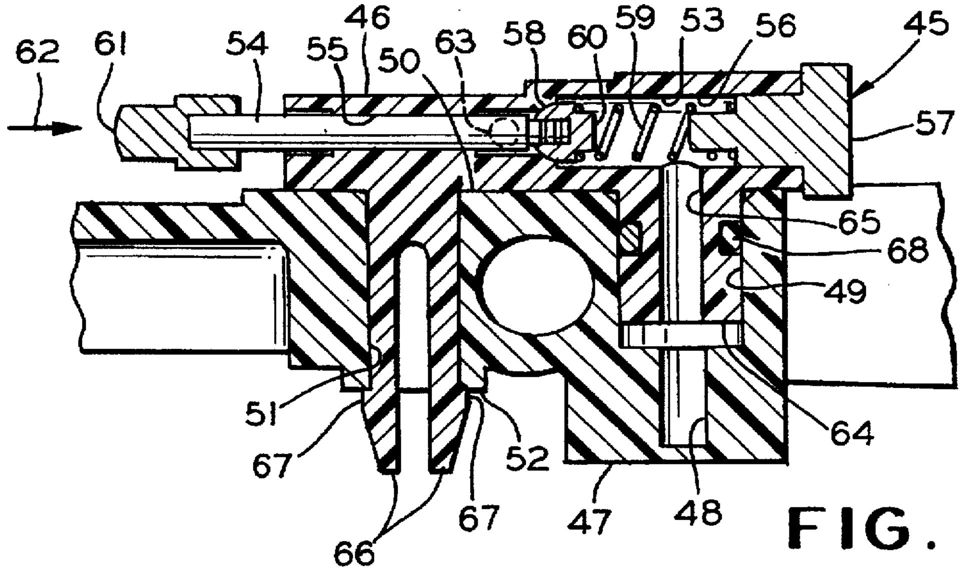
FIG. 3 is an enlarged cross sectional view showing details of a pneumatic trigger valve for a paint spray gun according to the invention.

FIG. 3 shows details of an improved pneumatic valve 45 for use in a spray gun having a pneumatic triggering circuit similar to the circuit 10 of FIG. 1. The valve 45 is a module having a housing 46 which is separate from and is releasably secured to a spray gun skeleton or housing 47. The spray gun housing 47 has a pressurized air passage 48 having an enlarged diameter end 49 which opens at a surface 50. The passage 48 communicates with a chamber (not shown) which corresponds to the chamber 21 in FIG. 1. The spray gun housing 47 also has a short passage 51 which is open at one end at the surface 50 and at an opposite end at a surface 52.

A stepped passage 53 extends through the valve housing 46. A valve stem 54 slides in an axial direction in the smallest diameter portion 55 of the passage 53. The largest diameter portion of the passage 53 forms a chamber 56 which is closed at one end by a plug 57. An annular valve seat 58 is formed at an end of the chamber 56 opposite the plug 57. A spring 59 is compressed between the plug 57 and a valve member such as a poppet 60 secured to the valve stem 54. The spring 59 urges the poppet 60 to normally engage and seal against the valve seat 58. The spring 59 only need exert a low force on the poppet 60 to assure seating of the poppet 60. It should be appreciated that pressurized air flowing through the chamber 56 also will urge the valve poppet 60 towards the seat 58 to close the valve 45. Once the valve 45 is closed the air pressure in the chamber 56 will act to maintain a tight seal. When squeezed to initiate spraying, the spray gun trigger pushes on an end 61 of the valve stem 54 to move the valve stem 54 in the direction shown by an arrow 62, thereby unseating the poppet 60. When the poppet 60 is moved away from the seat 58, any pressurized air in the chamber 56 flows past the poppet 60 and is exhausted primarily through a port 63 to atmosphere. However, sufficient clearance may be provided between the valve stem 54 and the housing passage 55 for a portion of the air to flow along the valve stem 54 to prevent an accumulation of dirt and paint overspray on the valve stem 54.

A nipple 64 is located on the end of the valve housing 46 adjacent the chamber 56. The nipple 64 is sized to slide into and closely engage the enlarged end 49 of the passage 48 in the spray gun housing 47. If desired, a seal such as an o-ring seal 68 may be provided to prevent the loss of air pressure between the nipple 64 and the spray gun housing 47. The nipple 64 has a central passage 65 which provides a flow path for pressurized air to flow from the spray gun passage 48 to the valve chamber 56. A pair of resilient fingers 66 are formed on the same side of the housing 46 as the nipple 64. The spacing between the fingers 66 and the nipple 64 corresponds to the spacing between the passage end 49 and the passage 51 on the spray gun housing 47. Thus, when the nipple 64 on the valve 45 is inserted into the spray gun passage end 49, the fingers 66 .enter the passage 51. The fingers 66 have hooked or barbed ends 67 which engage the spray gun housing surface 52 to lock the valve 45 on the spray gun housing 47. The barbed ends 67 deflect when the valve 45 is secured to the spray gun housing 47 and snap in place when the valve 45 is fully seated. It is necessary to squeeze the barbed finger ends 67 together in order to release and remove the valve 45 from the spray gun housing 47. It should be appreciated that although two fingers 66 are shown in the drawings, a single resilient finger also may be used to releasably secure the valve 45 to the spray gun housing 47. Other suitable releasable lock mechanisms also will be apparent to those skilled in the art.

The pneumatic valve 45 has several advantages over the prior art valve 30. The valve 45 may be handled and replaced by the spray gun user as a single module, rather than as a number of much smaller parts which can be easily dropped and lost. The valve 45 is easily replaced by the spray gun operator while remaining in a paint spray booth. It is only necessary to turn off the air pressure to the gun, release and remove the old valve, slide and lock a new valve in place, and turn on the air pressure so that painting may be resumed. The nipple 64 and the fingers 66 orient the valve 45 on the spray gun and do not permit incorrect installation. Wear on the component parts of the valve is greatly reduced over the prior art valve design because the forces on the moving parts are more axial in the valve 45 and a single low pressure spring is adequate to effect a positive seal when the spray gun trigger is released. The prior art valve required two stronger springs, with corresponding increased wear on sliding surfaces. Air flow when the spray gun is triggered also tends to self clean the valve 45 to prevent the accumulation of dirt and paint overspray.

It will be appreciated that various modifications and changes may be made to the above described preferred embodiment of a pneumatic trigger valve for a spray gun without departing from the scope of the following claims.

I claim:

1. A trigger operated pneumatic valve for a spray gun having a pneumatic actuator which turns on the spray gun when said trigger operated pneumatic valve is opened to vent pressurized air from the spray gun, said pneumatic valve comprising a valve housing, means for releasably attaching said valve housing to a spray gun to control the venting of pressurized air from such spray gun, a normally closed vent valve mounted in said valve housing to move between closed and open positions, means urging said vent valve to said closed position, means for moving said vent valve to said open position, and wherein said vent valve is adapted for venting pressurized air from an attached spray gun when said vent valve is in said open position.

2. A trigger operated pneumatic valve for a spray gun, as set forth in claim 1, and wherein said valve housing has a nipple adapted to engage a passage in the spray gun, and wherein said housing has a passage through said nipple for delivering pressurized air from the spray gun to said vent valve.

3. A trigger operated pneumatic valve for a spray gun, as set forth in claim 1, and wherein said means for moving said vent valve to said open position includes a valve stem mounted in said valve housing to slide in an axial direction, and wherein said valve stem is adapted to be moved in response to movement of a trigger on an attached spray gun.

4. A trigger operated pneumatic valve for a spray gun, as set forth in claim 1, and wherein said means urging said vent valve to said closed position includes pressurized air.

5. A trigger operated pneumatic valve for a spray gun, as set forth in claim 4, and wherein said means urging said vent valve to said closed position further includes a spring.

6. A trigger operated pneumatic valve for a spray gun having a pneumatic actuator which turns on the spray gun when said trigger operated pneumatic valve is opened to vent pressurized air from the spray gun, said pneumatic valve comprising a valve housing, means for releasably attaching said valve housing to a spray gun to control the venting of pressurized air from such spray gun including a releasable lock on said valve housing adapted to engage an attached spray gun housing, a normally closed vent valve mounted in said valve housing to move between closed and open positions, means urging said vent valve to said closed position, said valve housing having a nipple adapted to engage a passage in the spray gun and having a passage through said nipple for delivering pressurized air from the spray gun to said vent valve, means for moving said vent valve to said open position, and wherein said vent valve is adapted for venting pressurized air from an attached spray gun when said vent valve is in said open position.

7. A trigger operated pneumatic valve for a spray gun, as set forth in claim 6, and wherein said releasable lock comprises at least one resilient finger on said valve housing, said resilient finger having a barbed end adapted to releasably engage an attached spray gun housing.

8. A trigger operated pneumatic valve for a spray gun having a pneumatic actuator which turns on the spray gun when said trigger operated pneumatic valve is opened to vent pressurized air from the spray gun, said pneumatic valve comprising a valve housing, means for releasably attaching said valve housing to a spray gun to control the venting of pressurized air from such spray gun, a normally closed vent valve mounted in said valve housing to move between closed and open positions, means urging said vent valve to said closed position, means for moving said vent valve to said open position including a valve stem mounted in said valve housing to slide in an axial direction in response to movement of a trigger on an attached spray gun, and wherein said vent valve is adapted for venting pressurized air from an attached spray gun when said vent valve is in said open position, at least a portion of such vented air flowing between said valve stem and said valve housing, whereby any paint overspray is prevented from accumulating on said valve stem.

* * * * *